Jan. 31, 1967  E. W. HOWE  3,301,073
GYROSCOPE APPARATUS
Filed June 28, 1963

INVENTOR:
EDWIN W. HOWE
BY Howson & Howson
ATTYS.

United States Patent Office 3,301,073
Patented Jan. 31, 1967

3,301,073
GYROSCOPE APPARATUS
Edwin W. Howe, North Baldwin, N.Y., assignor to American Bosch Arma Corporation, Garden City, N.Y., a corporation of New York
Filed June 28, 1963, Ser. No. 291,546
12 Claims. (Cl. 74—5.7)

This application is a continuation-in-part of my copending application Ser. No. 243,263, filed Dec. 10, 1962, now abandoned and entitled Gyroscope Apparatus.

The present invention relates to gyroscopes and has particular reference to means for supporting and driving a two-axis gyroscopic element.

It is known in the prior art to support and drive a gyroscopic rotor by means of a universal-joint structure which employs ball, pivot, or spherical bearings to permit angular displacements between the rotational axis of the rotor and the rotational axis of the driving member. It has also been proposed to provide a flexible drive for a gyroscopic wheel by connecting the hub of the wheel to its rim by a flexible diaphragm or a flexible set of spokes, the rim then serving as the rotor and the hub being connected to a driving shaft.

While such arrangements, and particularly the universal joint structure using bearings, are useful in certain applications, in the forms thereof known to the prior art they possess certain inherent limitations or disadvantages with respect to the extent to which they are successful in decoupling from the rotor forces generated upon angular displacement of the driving shaft relative to the rotor, and also with respect to practical considerations relating to ease and cost of fabrication, and of maintenance, and to the duration of useful life of the structure.

Accordingly, it is an object of my invention to provide a new and useful gyroscope apparatus.

It is also an object to provide a new and improved mounting arrangement for a gyroscope.

Another object is to provide new and improved apparatus for supporting and driving a two-axis gyroscope of the class in which an intermediate member is pivotally connected between the driven rotor and the driving member which provides the torque to rotate the rotor.

It is another object to provide such apparatus which is easy to fabricate, simple to maintain, and has a long useful life.

It is also an object of my invention to provide a universal-joint mounted rotating gyroscope having an unusually long precession period.

A further object is to provide gyroscopic apparatus in which undesirable torques exerted on the rotor in a direction normal to its plane of rotation, upon angular displacement of the axis of the driving member from the plane of rotation of the rotor, are greatly reduced or effectively prevented from occurring.

In accordance with the invention the above objects are achieved by provision of a gyroscope in which an intermediate member is provided with connections both to a driving member and to a driven rotor, at least one of these connections having torsional resilience and producing a restoring torque between the elements which it connects. More particularly, these connections may each constitute pivot means, and restoring torque may be provided about the axis of pivot of the pivot means connecting the driving member to the intermediate member, herein designated as the "driven" pivot means, or about the axis of pivot of the pivot means connected between the intermediate member and the rotor, herein designated as the "driving" pivot means, or about both the driven and the driving pivots. Preferably the pivot means employed are leaf spring structures, such as crossed leaf spring supports, rigidly affixed to the members which they interconnect so that relative angular motion of the interconnected members is accomplished by flexure of the leaf springs.

In the preferred form of the invention there are no frictional forces to react upon the rotor, since the elements are rigidly interconnected. While the pivot means employed can be made to provide a torsional restraint which is slight, in all cases each such pivot will exert some degree of torsional restraint which might be expected to react substantially upon the rotor and produce some undesired precession thereof when the driving member is angularly displaced from a reference position. However, I have found that such torsional restraint about the driven pivots, rather than being disadvantageous, may be used to definite advantage by rotating the driving member at a rate lying in a particular range determined by the spring characteristics of the torsionally-restraining element of the driven pivot means and by the moments of inertia of the intermediate member, during operation of the rotor. By using rotation rates in this particular range, reaction forces which the pivots tend to produce on the rotor may be minimized, and even made substantially smaller than in usual universal joints having no spring restraints. In particular, by rotating the driving member at a particular speed designated herein as the effective resonant speed, the precession of the gyroscope rotor due to the spring-like restraint exerted by the pivots can be eliminated or greatly reduced.

With this arrangement in acordance with the invention, not only is precession of the rotor minimized, but, particularly since no bearings are utilized in the preferred embodiment, the structure used is easy to fabricate and maintain, is strong and simple in design, and has long useful life. Furthermore, the rotation speed at which the minimum in rotor precession appears can be made conveniently low by appropriate selection of the spring constants of the pivot means and of the mass and geometry of the intermediate member.

While particularly advantageous when embodied in the arrangement of fixedly-attached spring pivot means described above, the invention is also applicable to improve the performance of a gyroscope using a bearing-mounted pivot by introducing a spring restraint about the bearing-mounted pivot and rotating the driving member at the rates indicated above.

These and other objects and features of the invention will be more readily comprehended from a consideration of the following detailed description, taken in connection with the accompanying drawings, in which.

Figure 1:
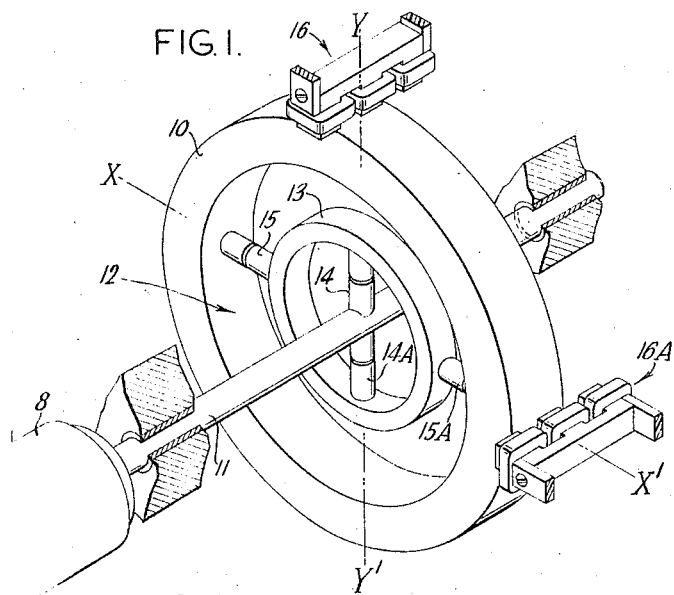
FIGURE 1 is a simplified perspective view of one type of gyroscope system to which the invention is applicable.

Referring now to FIGURE 1, which shows the general arrangement of a universal-joint gyroscope, a motor 8 is connected to rotate a gyroscopic rotor 10 by means of a journalled drive shaft 11 and a universal joint 12 which permits the spin axis of rotor 10 to assume a wide range of angular positions with respect to the axis of rotation of shaft 11. The universal joint 12 includes an intermediate member 13, in this case a ring-shaped gimbal, which is supported on shaft 11 by the coaxial driven pivot members 14, 14A and which in turn supports the rotor 10 by the coaxial driving pivot members 15, 15A. The axis through pivot members 14, 14A is substantially perpendicular to the axis through pivot members, 15, 15A. It is understood that the motor 8 and the journal supports for shaft 11 may be fixed to a common supporting frame carried by a vehicle to be guided or stabilized, for example.

As shaft 11 is rotated by motor 8, the rotor 10 spins and tends to maintain its plane of rotation even though shaft 11 may be displaced angularly with respect to the rotor spin axis, as by manoeuvering of the vehicle on which the gyroscope is installed. Pickoff devices 16, 16A, which are fixed to the same supporting frame to which the shaft 11 is journalled, sense any relative angular displacement between the shaft 11 and the gyroscope rotor 10, about the axes X–X' and Y–Y' respectively. Depending upon the use to which the gyroscope is put, the pickoff signals may be used for a number of purposes. For example, the pickoff signals may energize servo motors to maintain the supporting frame in a position for which the drive shaft and the rotor spin axis are substantially parallel, as in a direction indicator, or they may be used to control a craft auto pilot. The invention, however, is not concerned with the specific form of pickoff apparatus nor with the particular use to which the signals are put, but relates to the gyroscope support and driving means.

Figure 2:
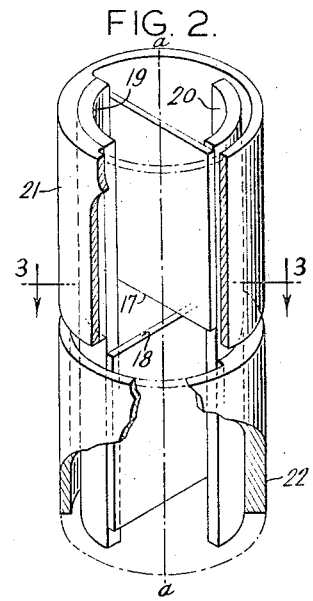
FIGURE 2 is a perspective view, partly broken away, showing a preferred form of pivot means for use in my invention.
Figure 3:
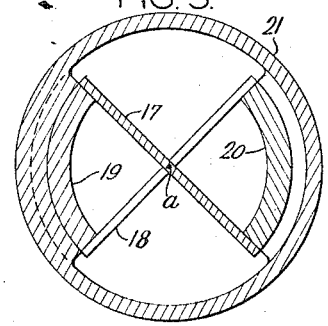
FIGURE 3 is a sectional view of the pivot means of FIGURE 2, taken along the line 3—3, showing the pivot means in its torsionally unstressed condition.

In accordance with one embodiment of the invention the pivots 14, 14A, 15 and 15A each constitute a flexure spring pivot. Such a pivot is shown in FIGURES 2 and 3, and is of a known type which has been used in the prior art for other puroses. In the form of this pivot shown in the drawings, opposite ends of a pair of rectangular leaf springs 17, 18 are secured, as by spot welding or brazing, to cylindrical-surfaced, opposed, concentric bars 19, 20 with the principal planes of the leaf springs crossed and substantially perpendicular to each other, the axis of their crossing a—a being substantially at the centers of the spans of the springs and along an axis of symmetry of the springs. If desired for additional strength the ends of the springs may be mounted in shallow, narrow slots in the bars. For ease of handling and attachment in the gyroscope, bars 19 and 20 are attached, as by brazing, to an upper cylindrical retainer 21 and a lower cylindrical retainer 22 respectively. Retainer 21 has an extra-thick wall adjacent the region of its attachment to bar 19 so as to provide clearance between the bar 19 and retainer 22, and retainer 22 has a similar extra-thick wall adjacent the region of its attachment to bar 20 to provide clearance between bar 20 and retainer 21.

One retainer 21 is attached to one member of the universal joint, such as shaft 11, and the other retainer 22 is attached to the adjacent member of the universal joint, such as intermediate member 13. This may readily be accomplished by providing an appropriate cylindrical recess in each region to which a pivot is to be connected, into which one of the cylindrical retainers of the pivot fits snugly, and soldering or brazing the end of the retainer in the recess. The shaft 11 is therefore able to rotate relatively about the axis through pivots 14, 14A with respect to the intermediate member 13, and intermediate member 13 is able to rotate about the axis through pivots 15, 15A with respect to rotor 10, over a substantial angle without friction and with relatively little restraint. The leaf springs, moreover, have considerable stiffness and strength in the lateral and radial directions with respect to shaft 11, and are therefore able to support a relatively heavy rotor 10 without resorting to such devices as fluid flotation of the rotor, for example.

Figure 4:
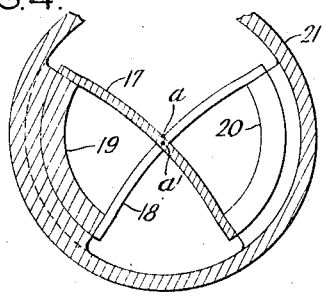
FIGURE 4 is a view similar to that of FIGURE 3, for the case in which the pivot is subjected to torsional stress during operation.

To provide the above operation, the pivots 14, 14A, 15, 15A, are preferably arranged so that their springs are unstressed, and so that the axes of crossing of the springs of opposite pivots are coaxial; also, the pairs of pivots 14, 14A and 15, 15A, are attached, respectively, to diametrically-opposite portions of the intermediate member 13, and to diametrically-opposed portions of the ring-shaped rotor 10. However it is understood that, in operation, flexure of the springs 17, 18 will produce a slight motion of the axis of crossing a—a of the springs 17, 18 in each pivot, for example from a to a' in FIGURE 4, wherein this motion is shown exaggerated. In order to reduce this possible source of error, it is preferable that the planes of the springs in pivot 14 be angularly disposed with respect to the planes of the springs in pivot 14A so that the relative motion of the axes of crossing of the springs in pivot 14 and in pivot 14A is rotational, rather than lateral, upon angular displacement between shaft 11 and intermediate member 13. Furthermore, the angular displacement of the axis of crossing preferably takes place in the plane of rotation of the intermediate member 13, rather than perpendicular thereto, lest unwanted torques be applied to the rotor 10 through pivots 15, 15A. This angular displacement within the plane of rotation of intermediate member 13 insures that the center of support will not shift during operation. However, these latter effects produced by motion of axis a—a are relatively small, especially for small angles of spring deflection, and can safely be ignored in all but the most precise applications of this invention.

The leaf spring pivots can be made so that they exert very little restraint, and can then be used directly and with impunity in most gyroscopes other than those of highest precision. However, in the arrangement described herein, the existence of the small amount of restoring torque about the driven pivots has been discovered to be an advantage, rather than a disadvantage, in that if the shaft 11 is driven at or near a particular speed, which will be designated herein as the effective resonant speed, the torques exerted on the rotor 10 about an axis normal to its spin axis decrease, and the precession period of the gyro increases, markedly over that which would be expected when the driving shaft is angularly displaced from the rotor spin axis.

Figure 5A:
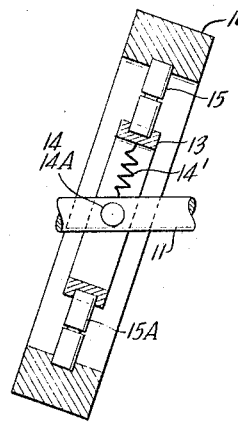
FIGURES 5A and 5B are diagrammatic representations illustrating conditions in a gyroscope like that of FIGURE 1 during its operation, for a reference position of the rotor and for a rotor position one-quarter revolution different from the selected reference position, respectively.
Figure 5B:
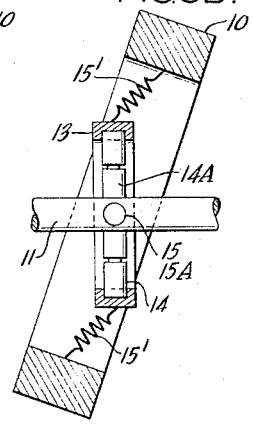

An investigation of this phenomenon has resulted in the following explanation. Reference is made to FIGURES 5A and 5B which represent the rotor 10, the intermediate member 13, the driving shaft 11, and the pivots 14, 14A, and 15, 15A in two positions thereof which occur 90 degrees apart during the rotation of shaft 11 when the rotor 10 is inclined to shaft 11. It will be seen that the gyroscope consists of a rotating mass 10 coupled to the supporting and driving shaft 11 by means of a ring-shaped intermediate member 13 mounted to pivot about the two mutually perpendicular axes of the spring restraint pivots 14, 14A, 15 and 15A. The characteristics of the spring pivots 14, 14A, 15, 15A result in a low spring gradient about the support axes, as suggested by the diagrammatic showing of coil springs in FIGURES 5A and 5B. In the static condition, the coupling of the rotor 10 to support shaft 11 is the result of the spring restraint provided by inner pivots 14, 14A when the rotor is oriented as in FIGURE 5A, as represented by the spring 14', and is a result of the spring restraint of the outer pivots 15, 15A when oriented as in FIGURE 5B, as represented by the springs 15'.

It will be seen that when the axis of rotor 10 is not aligned with the axis of the drive shaft 11 while the shaft 11 is rotated, the gimbal ring 13 is forced into oscillation about the pivots 14, 14A and 15, 15A. The acceleration of the oscillating gimbal ring in combination with the inertia of the gimbal about three axes results in reaction torques about the supporting axes. These reactions are provided by the supporting shaft 11 and the gyro rotor 10. The behavior of the gyro can be explained by considering that the total restraint between the gyro and the rotating shaft is composed of two effects: first, the spring restraint of the pivots 14, 14A and 15, 15A and second, an anti-spring effect due to the oscillating gimbal ring. The first effect is constant and causes the gyro rotor to precess in one direction. The second effect is dependent upon the inertia of the gimbal ring about three orthogonal axes and increases with the square of the rotational speed, and causes the gyro rotor to precess in the opposite direction. At one, and only one, rotational speed, the speed-responsive anti-spring effect will be exactly equal and opposite to the fixed spring effect, thereby resulting in a net zero effective restraint on the gyro. The precession period vs rotational speed characteristic of the gyroscope, shown in FIGURE 6, resembles the characteristic of a mechanically resonant system and for this reason the speed of maximum precessional period has been termed the "effective resonant speed." Below this critical speed the spring-restraint effect predominates, while above this speed the inertia-reaction torque predominates, and this too results in an effective stiffening of the system.

As a specific example of an embodiment of the invention, rotor 10 may be a stainless steel ring about 2½" in outer diameter having a width of about 1", a central opening about 1" in diameter, and a polar moment of inertia of about 2420 gm./cm.² Intermediate member 13 may be a stainless steel ring about ¾" in diameter, about ½" in width, and having a central opening about 7/16" in diameter. Shaft 11 may have a diameter of about ⅜". Each of the pivots 14, 14A, 15, 15A may comprise a crossed-leaf spring pivot of steel about ¼" in outer length and 5/32" in outer diameter, having an effect spring rate of about 0.22 lb./in. per radian for each pivot, which is nearly constant up to at least about 15 degrees of torsion angle.

Figure 6:
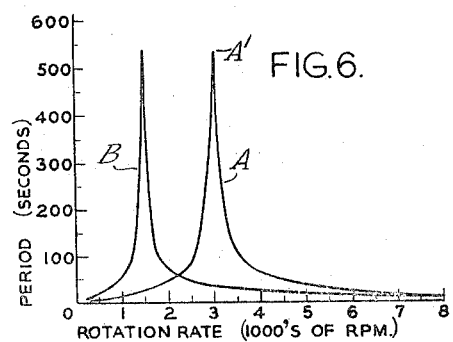
FIGURE 6 is a graphical representation to which reference will be made in explaining the invention.

Using these specific forms for the various elements of the gyroscope, it was found that the gyroscope was operative at rotation rates of about 8,000 r.p.m., for example, although substantial restraints were apparently operating on the rotor. However, by varying the rotor speed and recording the precession period of the gyroscope for various speeds, it was found that at about 3100 r.p.m. the period increased drastically, as shown by curve A of FIGURE 6 in which ordinates represent the precession period in seconds and abscissae represent rotor rotation rate in thousands of revolutions per minute. At the speed A' of about 3,100 r.p.m. the period increases sharply to about 50 times that which would be expected on the basis of the known spring constants of the pivots, and even at 2600 and 3600 r.p.m. the period is a number of times greater than at rates such as 1,000 or 8,000 r.p.m. which are remote from the effective resonant speed of 3100 r.p.m. By adding mass to the intermediate member 13 the effective resonant speed was decreased to about 1500 r.p.m., as shown by curve B of FIGURE 6, illustrating the dependence of the effective resonant speed on the inertia of the intermediate member.

The precession rate $\Omega$, which is $2\pi$ divided by the precession period, equals the net restraint divided by the momentum, and may be defined by the following expression:

$$\Omega = \frac{K - \frac{1}{2}\omega^2(Ix + Iy - Iz)}{\omega I_o} \text{ (radians/sec.)}$$

where $\omega$ = angular velocity of the driving shaft in radians/second;

$Ix, Iy$ = respective moments of inertia of the intermediate member about the mutually-perpendicular $x$ and $y$ axes of the pivots, respectively, in gm./cm.²;

$Iz$ = polar moment of inertia of the intermediate member in gm./cm.²;

$I_o$ = polar moment of inertia of the rotor in gm./cm.²; and $K$ = average of the restoring torque gradients about the $x$ and $y$ axes due to the spring restraints, or $Kx + Ky/2$, in dyne/cm./radian.

Accordingly, the effective resonant angular velocity producing minimum precession occurs when $$K = \frac{1}{2}\omega^2(Ix + Iy - Iz)$$

Figure 7:
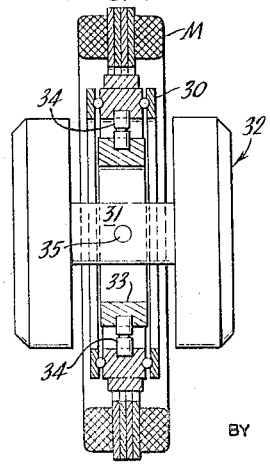
FIGURES 7 and 8 are side views, partly in section, illustrating applications of the invention to two other types of gyroscope structure.

It will be appreciated that the arrangement can also be applied to other forms of universal joint gyros. For example, in FIGURE 7 the driving member of the gyroscope is the outermost ring 30 and the axle 31 of the gyroscopic wheel 32 is the inner member, while the gimbal ring or intermediate member 33, connected to both of the pivot members 34, 35, is physically between them. In this case the outer ring 30 may be rotated by a conventional, surrounding magnetic drive means. The driven pivots are pivots 34, 34 and the driving pivots are 35, 35 and it is the spring-mass relationship at these pivots which dictates the effective resonant speed.

It should be pointed out at this time that even a "frictionless" bearing universal joint gyro exhibits the same speed-responsive coupling discussed earlier. The coupling is zero only at zero speed and increases with speed according to the square of the speed. This stiffening effect probably accounts for the previous failure to develop a successful universal joint gyro. The present invention corrects this deficiency by effectively biasing the speed-responsive characteristic with the spring coupling, which has a constant but opposite effect on the net coupling, so that the effective zero restraint occurs at a speed at which the rotor is endowed with gyroscopic properties. The greater the spring coupling, the higher the speed at which zero restraint occurs.

Figure 8:
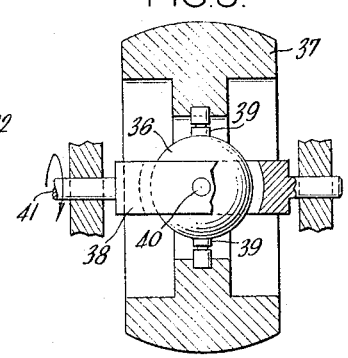

In FIGURE 8 the intermediate member 36 is a sphere connected between the rotor 37 and the driving member 38 and is physically the centrally-disposed member in the universal joint, supporting the driven wheel-shaped rotor 37 on pivot members 39 and being supported in turn in the driving ring 38 by the pivot members 40. The shaft 41 of the driving ring 38 may be driven by conventional motive means, not shown. The driven pivots are pivots 40, the driving pivots are 39, and it is the spring-mass relationship at these pivots which determines the effective resonant speed.

Figure 9:
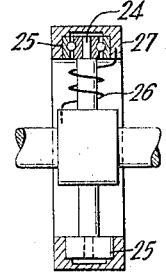
FIGURE 9 is a fragmentary side-view, partly in section, illustrating an application of the invention to a bearing-mounted pivot.

The elastic restraint provided around the gyroscope pivots in accordance with the invention has advantages not present in conventional ball bearings or pivot bearings, and some of these advantages can be provided in a pivot of the type using a bearing by adding a spring which provides a restoring torque about the pivot. FIGURE 9 illustrates such a pivot, comprising a stub shaft 24 in a bearing 25 and a spiral spring 26 connected between the shaft 24 and the support 27 for the bearing 25. If for example each of the pivots in universal joint 12, FIGURE 1, are of the ball bearing or jewel bearing type as in the prior art, the operation thereof can be improved by modifying the bearings according to this invention by adding elastic restraint as shown in FIGURE 9. If desired another spring similar to and cooperating with spring 26 may be used to provide torsion about the lower bearing in FIGURE 9.

While the invention has been described with reference to specific embodiments thereof, it will be understood that it may be embodied in many diverse forms without departing from the scope of the invention as defined by the appended claims.

I claim:
1. Gyroscope apparatus comprising:
 a gyroscope rotor circularly symmetrical with respect to an axis of symmetry through it;

a drive shaft rotatable about an axis fixed in said shaft for rotating said rotor about its axis of symmetry;

a universal joint for connecting said drive shaft operatively to said rotor;

said universal joint comprising an intermediate member circularly-symmetrical about an axis through said member, a pair of driven pivots means having collinear pivot axes disposed substantially perpendicular to said axis of symmetry of said intermediate member and each connecting said drive shaft to said intermediate member to transmit torque from said drive shaft to said intermediate member while permitting said intermediate member to pivot about said driven pivot axes, and a pair of driving pivots having collinear pivot axes disposed substantially perpendicular to said axis of symmetry of said rotor and to said driven pivot axes and each connecting said intermediate member to said rotor to transmit torque from said intermediate member to said rotor about the axis of symmetry of said rotor while permitting said rotor to tilt about said driving pivot axes;

each of said driven pivots and said driving pivots comprising a crossed leaf spring support containing a pair of leaf springs disposed with their planes mutually perpendicular and having collinear axes of symmetry, each of said leaf springs being arranged to operate in flexure to provide a restoring torque about the pivot axis of its associated pivot.

2. Apparatus in accordance with claim 1, comprising means for rotating said shaft at a rate for which precession of said rotor is a minimum.

3. Gyroscope apparatus comprising:

a gyroscope mass to be rotated;

a driving member rotatable about an axis fixed therein for driving said mass in rotation; and universal joint means connected to said mass and to said driving member for enabling rotation of said mass by said driving member about an axis through and fixed with respect to said mass, said last-named axis being variably oriented with respect to said axis through said driving member;

said universal joint means comprising an intermediate member, driven pivot means connected to and extending between said driving member and said intermediate member for applying driving torque to said intermediate member from said driving member while permitting pivotal motion of said axis of said driving member with respect to said intermediate member about said driven pivot means, and driving pivot means connected to and extending between said intermediate member and said mass for applying torque to said mass from said intermediate member while permitting pivotal motion of said axis through said mass with respect to said intermediate member about said driving pivot means;

said driven pivot means comprising spring means connected to and between said driving member and said intermediate member for providing a spring-like pivotal restoring torque between said driving member and said intermediate member, about the pivot axis of said driven pivot means, upon angular displacement of said driving member from a rest position with respect to said intermediate member;

said spring means comprising the assembly of a pair of support members, one fastened to said driving member and the other to said intermediate member, a first leaf spring having its opposite ends fastened to said first and second support members respectively, and a second leaf spring having its opposite ends fastened to said first and second support members respectively, said first and second leaf springs being disposed in mutually-perpendicular crossed planes extending through a common axis of symmetry of said leaves when said leaves are unstressed.

4. Gyroscope apparatus comprising:

a gyroscope mass to be rotated;

a driving member rotatable about an axis fixed therein for driving said mass in rotation; and universal joint means connected to said mass and to said driving member for enabling rotation of said mass by said driving member about an axis through and fixed with respect to said mass, said last-named axis being variably oriented with respect to said axis through said driving member;

said universal joint means comprising an intermediate member, driven pivot means connected to and extending between said driving member and said intermediate member for applying driving torque to said intermediate member from said driving member while permitting pivotal motion of said axis of said driving member with respect to said intermediate member about said driven pivot means, and driving pivot means connected to and extending between said intermediate member and said mass for applying torque to said mass from said intermediate member while permitting pivotal motion of said axis through said mass with respect to said intermediate member about said driving pivot means;

said driven pivot means comprising spring means connected to and between said driving member and said intermediate member for providing a spring-like pivotal restoring torque between said driving member and said intermediate member, about the pivot axis of said driven pivot means, upon angular displacement of said driving member from a rest position with respect to said intermediate member;

said driving pivot means comprising spring means connected to and between said intermediate member and said mass, said last-named spring means comprising a pair of mutually-perpendicular leaf springs having respective axes of symmetry which are collinear when unstressed.

5. Gyroscope apparatus comprising:

a gyroscope rotor member;

a rotatable member for supporting said rotor member; and universal joint means for mounting said rotor member on said rotatable member;

said universal joint means comprising an intermediate member, first connecting means extending between said rotatable member and said intermediate member for supporting said intermediate member on said rotatable member and for transferring rotational energy between said rotatable member and said intermediate member, and second connecting means extending between said intermediate member and said rotor member for supporting said rotor member on said intermediate member and for transferring rotational energy between said intermediate member and said rotor member;

at least one of said first and second connecting means comprising a pair of unitary bearingless support structures each of which is fixedly secured at one end thereof to said intermediate member, fixedly secured at its opposite end to one of said rotatable member and said rotor member, and disposed along an axis extending between said intermediate member and said one member, each said support structure being axially and laterally stiff to prevent substantial axial and lateral motion between said intermediate member and said one member but torsionally compliant to permit substantial relative rotation between said one member and said intermediate member about said axis, so as to render said one connecting means free of frictional forces opposing said relative rotation, said one connecting means providing a restoring torque between said intermediate member and said one member about said axis when said intermediate member is subjected to said relative rotation about said axis.

6. Apparatus in accordance with claim 5, comprising means for rotating said rotor member substantially at the effective resonant speed for which the precessional drift of said rotor member is a minimum.

7. Gyroscope apparatus comprising:
   a gyroscope rotor member;
   a rotatable member for supporting said rotor; and
   universal joint means for mounting said rotor member on said rotatable member;
   said universal joint means comprising an intermediate member, first connecting means extending between said rotatable member and said intermediate member for supporting said intermediate member on said rotatable member and for transferring rotational energy between said rotatable member and said intermediate member, and second connecting means extending between said intermediate member and said rotor member for supporting said rotor member on said intermediate member and for transferring rotational energy between said intermediate member and said rotor member;
   said first connecting means comprising a first pair of unitary bearingless support structures each of which is fixedly secured at one end thereof to said intermediate member, fixedly secured at its opposite end to said rotatable member, and disposed along a first axis extending between said intermediate member and said rotatable member, each of said support structures of said first pair being axially and laterally stiff to prevent substantial axial and lateral motion between said intermediate member and said rotatable member but torsionally compliant to permit substantial relative rotation between said intermediate member and said rotatable member about said first axis, so as to render said first connecting means free of frictional forces opposing said relative rotation, said first connecting means providing a restoring torque between said intermediate member and said rotatable member about said first axis when said intermediate member is subjected to said relative rotation about said first axis;
   said second connecting means comprising a second pair of unitary bearingless support structures each of which is fixedly secured at one end thereof to said intermediate member, fixedly secured at its opposite end to said rotor member, and disposed along a second axis which extends between said intermediate member and said rotor member and is substantially normal to said first axis, each of said support structures of said second pair being axially and laterally stiff to prevent substantial axial and lateral motion between said intermediate member and said rotor member but torsionally compliant to permit substantial relative rotation between said intermediate member and said rotor member about said second axis, so as to render said second connecting means free of frictional forces opposing said relative rotation about said second axis, said second connecting means providing a restoring torque between said intermediate member and said rotor member about said second axis when said intermediate member is subjected to said relative rotation about said second axis.

8. Apparatus in accordance with claim 7, comprising means for rotating said rotor member substantially at the effective resonant speed for which precessional drift of said rotor member is a minimum.

9. Apparatus in accordance with claim 7, in which at least one of said first and second connecting means comprises leaf-spring means deflected by relative rotation of said intermediate member about either of said first and second axes.

10. Apparatus in accordance with claim 7, in which each of said support structures comprises a crossed leaf spring support fixedly secured at one end to said intermediate member and its opposite end to one of said rotor member and said support member.

11. Apparatus in accordance with claim 7, in which said rotatable member comprises a drive shaft, and in which said intermediate member is disposed symmetrically about the axis of said drive shaft and said rotor member is disposed symmetrically about said intermediate member.

12. Apparatus in accordance with claim 11, in which said intermediate member and said rotor member are both ring-shaped, and comprising means for supplying torsional drive to said drive shaft.

References Cited by the Examiner

UNITED STATES PATENTS

| 2,517,612 | 8/1950 | Varian | 74—5 X |
| 2,581,965 | 1/1952 | Miller | 74—5 |
| 2,940,318 | 6/1960 | Adams et al. | 74—5.47 |

FOREIGN PATENTS 953,662  12/1956  Germany.

FRED C. MATTERN, Jr., *Primary Examiner.*

BROUGHTON G. DURHAM, *Examiner.*

T. W. SHEAR, J. D. PUFFER, *Assistant Examiners.*